United States Patent [19]

Ono et al.

[11] Patent Number: 5,002,988
[45] Date of Patent: Mar. 26, 1991

[54] POLYAMIDE BASE BINDER FOR USE IN METAL POWDER INJECTION MOLDING PROCESS

[75] Inventors: Hiroshi Ono, Isehara; Katuyoshi Saitoh, Kyoto; Haruo Yagami, Fujisawa; Takeo Saiki, Hiratsuka; Yoshimichi Masuda, Chigasaki, all of Japan

[73] Assignee: Sanwa Chemical Industry Co., Ltd., Japan

[21] Appl. No.: 379,604

[22] Filed: Jul. 13, 1989

[30] Foreign Application Priority Data

Feb. 4, 1988 [JP] Japan .................. 63-24477

[51] Int. Cl.$^5$ ............... C08K 5/3477; C08K 5/17
[52] U.S. Cl. ...................... 524/100; 524/227
[58] Field of Search ................ 524/100, 227

[56] References Cited

U.S. PATENT DOCUMENTS

| 4,290,935 | 9/1981 | Muraki | 524/227 |
| 4,395,509 | 7/1983 | Blackwell et al. | 524/227 |
| 4,490,324 | 12/1984 | Mollison | 524/227 |
| 4,500,665 | 2/1985 | Breckev et al. | 524/227 |
| 4,684,684 | 8/1987 | Abe et al. | 524/227 |

FOREIGN PATENT DOCUMENTS 7119951 7/1982 Japan .................. 524/227

Primary Examiner—Paul R. Michl
Assistant Examiner—Christopher P. Rogers
Attorney, Agent, or Firm—Jacobs & Jacobs

[57] ABSTRACT

A polyamide binder for use in injection molding a metal powder comprising in combination: (a) 40 to 50 wt % of a polyamide resin component having an average molecular weight of not less than 20,000 and prepared by co-polycondensation of a mixture of dimer acid, azelaic acid, ethylenediamine and xylylenediamine each being mixed in a substantially equal molecular equivalent ratio; (b) 20 to 30 wt % of ethylene-bis-laurylamide; and (c) the balance of N,N-diacetylpiperazine.

5 Claims, No Drawings

POLYAMIDE BASE BINDER FOR USE IN METAL POWDER INJECTION MOLDING PROCESS

BACKGROUND OF THE INVENTION

1. Field of the Invention

The present invention relates to an improvement in a polyamide base binder which is used in the metal powder injection molding process.

2. Description of the Related Art

In the metal powder injection molding process, a metal powder material is mixed with a binder, followed by molding, degreasing and sintering, to prepare a molded article. This process has advantages over the other general powder metallurgical processes in that an article having a complicated shape can be molded by a single step and the subsequent machining or after-treating steps can be eliminated. Thus, the process is particularly suited for the production of relatively small size metal parts, and has a considerable merit in its low production cost.

However, since a relatively large quantity of binder was used in such a metal powder injection molding process, collapsing, cracking or carbonization of the used binder could occur in the degreasing and/or sintering steps, which posed problems to be solved.

It is also known to prepare, for instance, alumina ceramics by the utilization of similar technology. When the metal powder injection molding process is compared with the similar technology for the production of alumina ceramics, the true specific gravity of the metal ranges generally from 7 to 8 (such as for iron base alloys), which is about 2 times as high as that of the alumina ceramics. In view of the difference in specific gravity, the molded article produced by the metal powder injection molding process tends to be deformed (sometimes by collapsing) due to its own weight during the degreasing steps. When a large quantity of a high polymer material is used in the binder to prevent deformation, carbonized portions are formed during the degreasing and/or sintering steps which result in a product of inferior quality.

Thus, the result of the metal powder injection molding depends on the selection of used binder and it is an important factor to use a superior binder to obtain molded products of high quality.

In the conventional technology, generally used binders are composed of plural binder components having different melting points. The binder components of each known binder has different melting points to ensure gradual and continuous flow-out of the liquefied binder composition during the degreasing step, the binder composition flowing out of the molded article being absorbed by an absorbent. A typical example of such binder composition is disclosed in Japanese Patent Publication No. 48563/1986 . However, when such a binder is combined with a metal powder having a high specific gravity, the molded body tends to deform due to the weight of the metal powder itself during the degreasing step as the binder components are liquefied.

OBJECTS AND SUMMARY OF THE INVENTION

Accordingly, the principal object of this invention is to provide a binder for use in a metal powder injection molding process, by the use of which the aforementioned problem occurring in the degreasing and/or sintering steps can be obviated.

A more particular object of this invention is to provide such a binder composed of a ternary amide composition, the components of which are gasified gradually during the injection molding process.

The polyamide base binder provided by this invention exhibits strong bonding force due to its inherent affinity to metal powders to ensure shape-retention of the molded article not only after the compaction thereof by the molding step but also during the subsequent degreasing step.

The polyamide binder for use in injection molding a metal powder, provided by the invention, comprises in combination: (a) 40 to 50 wt % of a polyamide resin component having an average molecular weight of not less than 20,000 and prepared by condensation of a mixture of dimer acid, azelaic acid, ethylenediamine and xylylenediamine each being mixed in a substantially equal molecular equivalent ratio; (b) 20 to 30 wt % of ethylene-bis-laurylamide; and (c) the balance of N,N-diacetylpiperazine.

DESCRIPTION OF THE INVENTION

The polyamide base binder of the invention comprises a polyamide resin component (a) and amide compounds (b) and (c). The polyamide resin component (a) is the main ingredient and may be prepared by co-polycondensating dimer acid, azelaic acid, ethylenediamine and xylylenediamine. In the mixture used for the starting material for the polyamide resin component (a), substantially equal molecular equivalents of respective four compounds (although the dimer acid is not a single compound but a mixture of several or more polymeric products of unsasturated fatty acids, this material will be described as though it were a single compound for the simplicity and clarity of description) are mixed together. The dimer acid generally contains 95% or more of $C_{36}$-dimeric acid, the preferable being the dimer acid products which are referred to as "high purity dimer acid". The preferable dimer acid is a mixture containing, as the main ingredient, the compound ($C_{36}$-dimeric acid) represented by the following structural formula of:

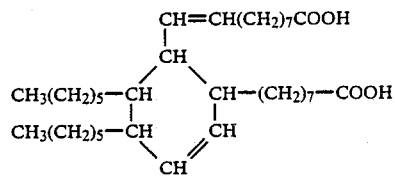

Such high purity dimer acid products may be commercially available, the examples being Lustydyme DA-500 (trade name of Nikka Kasei Co., Ltd.) and Hystrene 3695 (produced and sold by Witco Chemical Corp.)

The co-polycondensation reaction is a dehydration reaction, and the resultant polyamide product which is used as the polyamide resin component (a) used in the invention preferably has an average molecular weight of not less than about 20,000. The polyamide resin component (a) having an average molecular weight of 200,000 or even more may be used in the invention with no significant problem. In order that the molded article made of metal powder having a relatively high specific gravity preserves or retain its shape, it is preferable that the share of polyamide resin component (a) ranges from about 40 wt % to about 50 wt % of the total weight of the binder composition. If the content of the component (a) is less than about 40 wt %, the shape-retention at the degreasing step becomes unsatisfactory. On the contrary, as the content of the component (a) is increased beyond about 50 wt %, the amount of residing carbon left unburned at the sintering step is increased to raise the rejection percentage of the final product article made of sintered metal powder. The amide compounds used in the invention as the second and third components are ethylene-bis-laurylamide (b) and N,N-diacetylpiperazine (c).

Ethylene-bis-laurylamide (b) may be prepared from a mixture containing about 1 mol of ethylenediamine and about 2 mols of lauric acid through the known dehydro-condensation process. Although it is desirous to use lauric acid of 100% purity, the commercially available lauric acid generally contains impurities, such as capric acid, myristic acid, palmitic acid and stearic acid. Such a commercially available product may be used, without significant deterioration of the final molded article of metal, as far as the total content of these impurities does not exceed 25% of the used lauric acid material. The ethylene-bis-laurylamide (b) provides the parting or releasing property after the molding step, and may be used in an amount of from about 20 wt % to 30 wt %, preferably from about 25 wt %, based on the weight of the binder composition.

N,N-diacetylpiperazine (c) used as the third component in the composition of the invention may be prepared by subjecting a mixture of about 1 mol of piperazine and about 2 mols of acetic acid to ordinary dehydro-condensation. This compound gasifies slowly at the initial stage of the degreasing step to form channels through which other components of the binder and the decomposition or burned products originated therefrom are expelled from the molded article. This compound (c) is used in an amount of from about 20 to about 40 wt %, preferably from about 25 to about 30 wt %, based on the total weight of the binder. If it is used in an amount exceeding the aforementioned range, the properties of the binder, particularly the releasing property, is impaired. Well-distributed channels are not formed at the degreasing step, if the amount of the compound (c) is less than the aforementioned range, to often result in blistering or cracking of the final sintered article.

Although it is not intended that the invention be limited to this theory, it is thought that the components of the binder of this invention have strong chemical affinity with the surface of the substances combined therewith, such chemical affinity being inherent to the amide compounds including polyamide resins, whereby the deformation of the molded article during the degreasing step is prevented.

In brief, one of the important aspects of this invention resides in the use of compounds having amide groups which interact with the surface of metal particles to exhibit satisfactory shape retention of the molded article made of the metal particles, such as fine spherical stainless steel particles having relatively high specific gravity, without causing various troubles otherwise inevitable when the conventional binders are used.

The aforementioned polyamide resin component (a) and amide compound components (b) and (c) are mixed by heating or fusing to form a binder composition which may be used in various forms, such as a sheet, pellets or a powdered form.

The mixing ratio of the metal powder to the binder of this invention varies depending on the specific kind of the used powder and the form of the binder. However, generally speaking, 5 to 15 parts by weight of the binder of the invention is added to 100 parts by weight of the metal powder.

Alternatively, the metal powder may be admixed directly with respective components (a), (b) and (c) for the binder.

Any known injection molding processes may be applied to mold the metal powder mixed with the binder of the invention.

The binder of this invention exhibits improved shape retention, as compared to conventional binders to give a denser sintered articles having good metallic luster. Accordingly, by the sue of the binder of this invention, collapsible materials, such as fine spherical metal particles, may be easily molded by injection molding.

EXAMPLES OF THE INVENTION

The present invention will now be described in detail by referring to some Examples thereof and Comparative Examples.

I. Preparation of Binder Composition

A mixture was prepared by using an equal molecular equivalent for each of dimer acid (Lustydyme DA-500), azelaic acid, ethylenediamine and xylylenediamine, and then the mixture was subjected to dehydro-polycondensation to prepare a polyamide resin having a molecular weight of about 40,000.

Separately, a mixture containing 1 mol of ethylenediamine and 2 mols of lauric acid was subjected to dehydro-condensation to prepare ethylene-bis-laurylamide.

A mixture containing 1 mol of piperazine and 2 mols of acetic acid was subjected to dehydro-condensation to prepare N,N-diacetylpiperazine.

The thus prepared three components were fused and mixed together in the mixing ratios as set forth in the following Table, followed by cooling and pulverization, to obtain Binders A to E.

|  | Polyamide | Ethylene-bis-laurylamide | N,N-diacetyl-piperazine |
| --- | --- | --- | --- |
| Binder A | 45 wt % | 25 wt % | 30 wt % |
| Binder B | 41 wt % | 29 wt % | 30 wt % |
| Binder C | 48 wt % | 25 wt % | 27 wt % |
| Binder D | 50 wt % | 21 wt % | 29 wt % |
| Binder E | 45 wt % | 30 wt % | 25 wt % |

Note:
Although it was found that the Binder A gave a molded article having superior strength, no significant difference was found between the Binders A to E in shape-retention property during the degreasing step and the density of the sintered articles. Satisfactory sintered articles were formed by the use of all of the Binders A to E.

For comparison purpose, Binders F to I each composed of the same polyamide resin, ethylene-bis-laurylamide and N-N'-diacetylpiperazine mixed in a ratio which is out of the range defined by the appended claims were prepared. The following Table shows the compositions of Binders F to I.

|  | Polyamide | Ethylene-bis-laurylamide | N,N-diacetyl-piperazine |
| --- | --- | --- | --- |
| Binder F | 52 wt % | 30 wt % | 18 wt % |
| Binder G | 38 wt % | 30 wt % | 32 wt % |
| Binder H | 46 wt % | 19 wt % | 35 wt % |

-continued

|  | Polyamide | Ethylene-bis-laurylamide | N,N-diacetyl-piperazine |
|---|---|---|---|
| Binder I | 40 wt % | 32 wt % | 28 wt % |

Also for the comparison purpose, Binders J to L, according to the conventional technology, having the compositions as set forth in the following Table were prepared.

|  | EVA Resin | Acrylic Resin | Paraffin Wax | Dibutyl-phthalate | Stearic Acid |
|---|---|---|---|---|---|
| Binder J | 35.2 wt % | 26.4 wt % | 26.4 wt % | 12.0 wt % | — |
| Binder K | 28.3 wt % | 26.5 wt % | 23.0 wt % | 14.2 wt % | 8.0 wt % |

|  | Polypropylene | Natural Wax | Paraffin Wax |
|---|---|---|---|
| Binder L | 40.0 wt % | 30.0 wt % | 30.0 wt % |

II-1 Preparation of Sintered Body

Each of the Binders A to L was added to a fine powder of stainless steel (irregular SUS304L stainless steel powder prepared by the water atomizing process and having an average particle size of 8.4 microns), followed by heating and kneading at 140° C., and then cooled and pulverized. A bobbin-shaped sample was injection molded under a pressure of 660 kg/cm$^2$. The amount of each binder added to the stainless steel powder and the temperature at the injection molding step are shown in Table 1. Subsequently, each molded sample was degreased by placing it in a hot air recirculating furnace, the temperature in the furnace being raised from 20° C. to 320° C. over a period of 50 hours and air being flown at a flow rate of 1 to 1.5 m/sec. After confirming that the quantity of residing binder in the degreased sample was descreased to less than 8% of that in the sample which had not yet been degreased, each sample was sintered in vacuum at 1350° C. for an hour.

The density and the carbon content of the sintered bodies (samples) are collectively shown in Table 1, with the quantity of the added binder and the temperature at the molding step. Also shown in Table 1 are the results of observation for checking the shape-retention of the samples.

II-2 Preparation of Sintered Body

Each of the Binders A to L was added to a fine powder of spherical stainless steel powder (SUS316L stainless steel powder prepared by the gas atomizing process and having an average particle size of 10 microns), followed by heating and kneading at 140° C., and then cooled and pulverized. A bobbin-shaped sample was injection molded under a pressure of 660 kg/cm$^2$. The amount of each binder added to the stainless steel powder and the temperature at the injection molding step are shown in Table 2. Subsequently, each molded sample was degreased and sintered under the conditions as described in II-1 above.

The density and the carbon content of the sintered bodies (samples) are collectively shown in Table 2, with the quantity of the added binder and the temperature at the molding step. Also shown in Table 1 are the results of observation for checking the shape-retention of the samples.

TABLE 1

| Composition of Binder | Parts by Weight of the Added Binder per 100 Parts by weight of Metal Powder | Injection Molding Temperature (°C.) | Shape of Sintered Body (50 Sintered Bodies) | | | Density | Content of Carbon in Sintered Body (wt %) |
|---|---|---|---|---|---|---|---|
| | | | Fair | Deformed | Melted | | |
| A–E | 12.0 | 150 | 50 | 0 | 0 | 7.70 | 0.001 |
| J | 11.0 | 170 | 12 | 38 | 0 | 7.27 | 0.050 |
| K | 11.0 | 140 | 29 | 21 | 0 | 7.29 | 0.013 |
| L | 11.0 | 165 | 0 | 0 | 50 | —* | 0.090 |

Note:
Used Metal Powder: Irregular SUS 316L stainless steel powder prepared through water atomizing process and having an average particle size of 8.4 microns. The suffix * shows that the density and the content of carbon could not be determined since a fairly well shaped sintered body could not be obtained.

TABLE 2

| Composition of Binder | Parts by Weight of the Added Binder per 100 Parts by weight of Metal Powder | Injection Molding Temperature (°C.) | Shape of Sintered Body (50 Sintered Bodies) | | | Density | Content of Carbon in Sintered Body (wt %) |
|---|---|---|---|---|---|---|---|
| | | | Fair | Deformed | Melted | | |
| A–E | 6.0 | 140 | 50 | 0 | 0 | 7.72 | 0.002 |
| J | 6.5 | 140 | 12 | 38 | 0 | —* | —* |
| K | 6.0 | 130 | 29 | 21 | 0 | —* | —* |
| L | 6.0 | 140 | 0 | 0 | 50 | —* | —* |

Note:
Used Metal Powder: SUS 316L stainless steel powder having spherical shape prepared through gas atomizing process and having an average particle size of 10 microns. The suffix * shows that the density and the content of carbon could not be determined since a fairly well shaped sintered body could not be obtained.

Although the molded bodies prepared with the use of the comparative Binders J, K and L should be baried in a support powder, such as alumina powder, to prevent collapsing during the degreasing step according to the teaching of the conventional technology, no such support powder was used and all samples were processed under the same conditions in order to demonstrate clearly the difference of the polyamide base binders of this invention from those of the conventiuonal technology.

III Result of Test:

The Binder A gave a sintered article having superior strength over those obtained by the use of other binders of the invention. However, no significant difference was found between the Binders A to E in shape-retention property during the degreasing step and the density of the sintered articles. Satisfactory sintered articles were formed by the use of all of the Binders A to E.

In contrast thereto, Binder F gave a degreased body having carbonized and blistered portions, and Binders G and I gave degreased bodies which were deformed at the degreasing step. The Binder H gave a molded body which was inferior in releasing property to cause difficulty in releasing the molded body from the mold. The binder I gave a degreased body which was deformed at the degreasing step.

What is claimed is:

1. A polyamide binder for use in injection molding a metal powder comprising in combination: (a) 40 to 50 wt % of a polyamide resin component having an average molecular weight of not less than 20,000 and prepared by co-polycondensation of a mixture of dimer acid, azelaic acid, ethylenediamine and xylylenediamine each being mixed in a substantially equal molecular equivalent ratio; (b) 20 to 30 wt % of ethylene-bis-laurylamide; and (c) the balance of N,N-diacetylpiperazine.

2. The polyamide binder of claim 1, wherein said polyamide resin component has an average molecular weight of about 40,000.

3. The polyamide binder of claim 1, wherein said dimer acid contains 95% or more of $C_{36}$-dimeric acid.

4. The polyamide binder of claim 3, wherein said $C_{36}$-dimeric acid is represented by the following structural formula of:

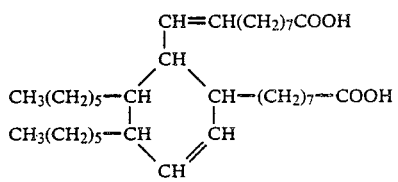

5. The polyamide binder of claim 1, wherein said binder is in the form of a sheet, pellets or a powder.